(12) United States Patent
Vuong et al.

(10) Patent No.: US 11,113,229 B2
(45) Date of Patent: Sep. 7, 2021

(54) PROVIDING A CONTINUATION POINT FOR A USER TO RECOMMENCE CONSUMING CONTENT

(71) Applicant: International Business Machines Corporation, Armonk, NY (US)

(72) Inventors: Steven Vuong, London (GB); Andrew Michael Lees, Ferndown (GB); Adam Elsbury, Bettws (GB); Pedro Miguel Vaz Trabuco, Amora (PT); Salma Saeed, Wolverhampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/430,148

(22) Filed: Jun. 3, 2019

(65) Prior Publication Data
US 2020/0379943 A1 Dec. 3, 2020

(51) Int. Cl.
*G06F 40/205* (2020.01)
*G06N 20/00* (2019.01)
*G06F 15/02* (2006.01)
*G06F 40/131* (2020.01)

(52) U.S. Cl.
CPC ........ *G06F 15/0291* (2013.01); *G06F 40/131* (2020.01); *G06F 40/205* (2020.01); *G06N 20/00* (2019.01)

(58) Field of Classification Search
CPC .. G06F 15/0291; G06F 40/205; G06F 40/131; G06N 20/00
See application file for complete search history.

(56) References Cited

U.S. PATENT DOCUMENTS

| | | | |
|---|---|---|---|
| 6,366,296 B1* | 4/2002 | Boreczky | G06F 3/0481 715/719 |
| 6,557,042 B1* | 4/2003 | He | G06Q 30/02 709/231 |
| 7,429,108 B2 | 9/2008 | Rosenberg | |
| 9,378,651 B2* | 6/2016 | Duga | B42D 9/007 |
| 9,411,422 B1* | 8/2016 | McClendon | G06F 3/016 |
| 9,483,110 B2* | 11/2016 | Bhogal | H04N 21/41407 |
| 9,641,912 B1* | 5/2017 | Morisetti | H04N 21/8455 |
| 10,057,630 B1* | 8/2018 | Panchaksharaiah | H04N 21/4333 |
| 10,089,059 B1* | 10/2018 | Taneja | G06F 16/686 |

(Continued)

FOREIGN PATENT DOCUMENTS

WO WO-2005073972 A1 * 8/2005 ............... H04N 5/76

OTHER PUBLICATIONS

Defination of concept by Lexico, accessed Jul. 30, 2020, 2 pages (Year: 2020).*

(Continued)

*Primary Examiner* — Yongjia Pan
(74) *Attorney, Agent, or Firm* — Brian D. Welle

(57) ABSTRACT

A pause point during consumption of media data is identified. The pause point is a point at which identify a user stops the consumption of the media data. A portion of content preceding the identified pause point is determined. The portion of content is analyzed to identify changes in content concepts in the portion of content. One or more continuation points for the user to return to the content based on changes in the content concepts in the portion of content are identified. The one or more continuation points are indicated to the user.

20 Claims, 6 Drawing Sheets

(56) References Cited

U.S. PATENT DOCUMENTS

| | | | | |
|---|---|---|---|---|
| 10,362,354 | B2* | 7/2019 | Panchaksharaiah | ............................ H04N 21/4333 |
| 10,595,101 | B2* | 3/2020 | Merler | .................. G06K 9/6267 |
| 2002/0120925 | A1* | 8/2002 | Logan | .................... A61K 36/48 725/9 |
| 2003/0093790 | A1* | 5/2003 | Logan | .................... G06F 16/739 725/38 |
| 2003/0112261 | A1* | 6/2003 | Zhang | .................... G11B 27/22 715/716 |
| 2003/0194211 | A1* | 10/2003 | Abecassis | .............. G11B 19/02 386/234 |
| 2007/0186163 | A1* | 8/2007 | Yeh | ........................ G11B 27/28 715/723 |
| 2009/0228569 | A1* | 9/2009 | Kalmanje | .......... H04N 7/17309 709/217 |
| 2010/0195975 | A1* | 8/2010 | Issa | ........................ H04N 9/79 386/343 |
| 2012/0114313 | A1* | 5/2012 | Phillips | ............ G11B 20/10527 386/298 |
| 2012/0206472 | A1 | 8/2012 | Kandekar | |
| 2012/0210203 | A1* | 8/2012 | Kandekar | ........... G06F 15/0291 715/230 |
| 2013/0117248 | A1* | 5/2013 | Bhogal | ........... H04N 21/41407 707/705 |
| 2014/0068428 | A1 | 3/2014 | Puppin | |
| 2014/0218286 | A1 | 8/2014 | Kim | |
| 2014/0278360 | A1* | 9/2014 | Clark | ..................... G06F 16/40 704/9 |
| 2014/0281982 | A1* | 9/2014 | Clark | ..................... G06F 3/0481 715/716 |
| 2014/0281989 | A1* | 9/2014 | Clark | ..................... G11B 27/10 715/717 |
| 2015/0169279 | A1 | 6/2015 | Duga | |
| 2015/0220253 | A1 | 8/2015 | Landau | |
| 2015/0350735 | A1* | 12/2015 | Koser | .................. H04N 21/435 725/37 |
| 2015/0356997 | A1* | 12/2015 | Wang | .................... G11B 27/22 386/240 |
| 2016/0274862 | A1* | 9/2016 | Duga | .................. G06F 16/489 |
| 2017/0083214 | A1* | 3/2017 | Furesjo | ............... G06F 3/04845 |

OTHER PUBLICATIONS

"Support for Kindle E-Readers," Amazon.com, printed Apr. 8, 2019, 2 pages. <https://www.amazon.com/gp/help/customer/display.html?nodeId=201241990>.

Anonymous, "Handheld book monitor," IP.com, Disclosure No. IPCOM000004487D, Nov. 29, 2000, 2 pages. <https://priorart.ip.com/IPCOM/000004487>.

IBM, "Cursor-Tracking Highlighter," IP.com, Disclosure No. IPCOM000118197D, Oct. 1, 1996, 5 pages. <https://priorart.ip.com/IPCOM/000118197>.

Kenji, "Use Watson Concept Insights to Find Related Unstructured Text Samples," IBM, Apr. 1, 2016, 7 pages. <https://developer.ibm.com/recipes/tutorials/use-watson-concept-insights-to-find-related-unstructured-text-samples/>.

Sporleder et al., "Automatic Paragraph Identification: A Study across Languages and Domains," Empirical Methods in Natural Language Processing, 2004, 8 pages. <https://www.aclweb.org/anthology/W04-3210>.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

PROVIDING A CONTINUATION POINT FOR A USER TO RECOMMENCE CONSUMING CONTENT

BACKGROUND

Aspects of the present invention relate to navigation within media data. Often when consuming media data such as a book or a podcast or a show or the like, it may be difficult for a user to recommence consuming the media data after a break in the consumption. For example, it may be difficult for a user to remember where they were within the media data. Alternatively, and/or additionally, the user may struggle to gain context of the immediate portion of data where they previously stopped consuming, such that the user may have to scour through previous portions to find a familiar anchor point from which to begin consuming in order to regain the "thread" or storyline or context of what they were consuming.

SUMMARY

Aspects of the disclosure relate to a system, a computer program product, and a computer-implemented method for managing consumption of media data. For example, the method may start by identifying a pause point in consumable media data at which the user stops consuming content of the media data. The method includes determining a portion of content that precedes the identified pause point. The method includes analyzing the portion of content to identify changes in content concepts in the portion of content. The method includes identifying one or more continuation points for the user to return to the content based on changes in the content concepts in the portion of content; The method includes indicating the one or more continuation points to the user.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
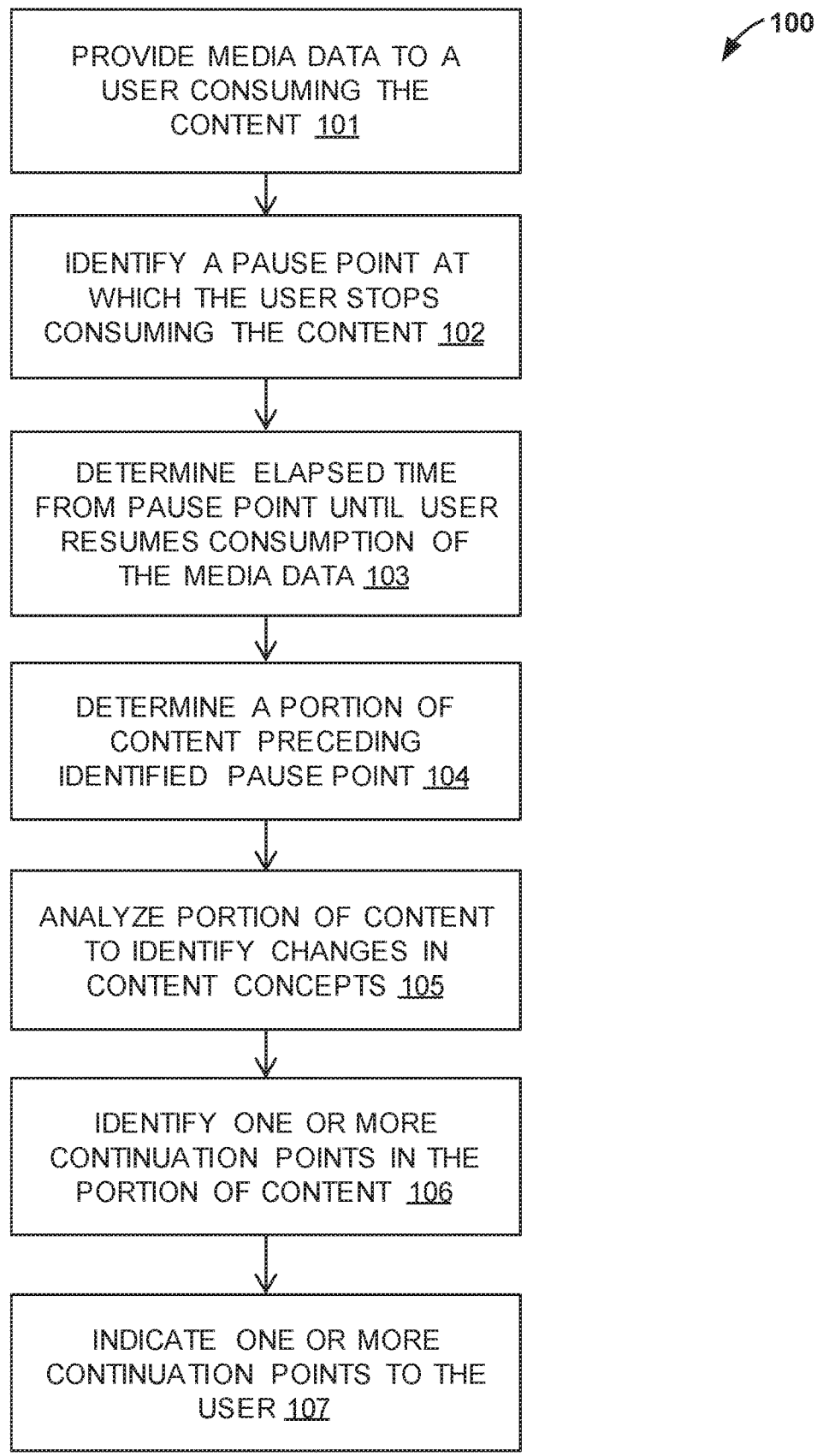
FIG. 1 is a flow diagram of an example method of managing the consumption of a media file.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Aspects of the present disclosure relate to navigation within media data, and more specific aspects of the present disclosure relate to providing a continuation point to enable a user to recommence consuming content of the media data. Aspects of the disclosure relate to providing a recommended continuation point for a user to recommence consuming content in media data after a break or a pause in the consumption. The media data may be textual data in an eBook or an electronic publication or the like, audio data in an audio book or podcast, visual data of a video file, or the like. In certain examples, consumption of media data may be managed as described herein using a device that is configured to utilize or otherwise analyze an auxiliary object that contains the media data (e.g., where the auxiliary object is a physical book and the device is a computing device that has a record of the data of the book and an ability to determine the user's place within the book). Media content may be any variety of electronic data that is formatted for consumption by a user, wherein consumption as used herein includes the user reading, listening to, watching, or otherwise be presented with and comprehend the media, data.

In some examples, a system may be configured to track where the user stops or pauses consuming content using digital bookmarks or by digitally highlighting a word (in the case of textual media data). This may require manual user input, reducing; the utility of the system to the user. Other methods may track the user's gaze and determine when a user looks away or removes their gaze from a media data, therein marking a location or word or sentence or the like at which the user has stopped consuming the media data. However, in either of these systems a user may fail to understand some context of the media data when resuming the consumption of the media data from the marked location (in situations where the user stopped reading for a relatively long period of time and lost the "thread" of the current point of the media data). In the case of audio recordings, it may be even more difficult to identify an appropriate continuation position, as it may be difficult for the user to peruse multiple portions of the media data to gain context of what is happening, and/or the audio data may be more likely to be stopped half way through a sentence or paragraph.

Aspects of this disclosure relate to autonomously determining one or more recommended continuation points in the content that precede the pause point based on changes in concepts of the media data. In this way, the continuation point(s) may be configured to enable the user to regain context and continuity of the content when resuming the consumption of the content.

Referring to FIG. 1, a flow diagram 100 shows an example method of determining continuation points. The method may be carried out by a content navigation system of a computing device (e.g., such as computing device 300 of FIG. 3). The computing device may include media content or may otherwise be configured to remotely access or analyze another device that includes the media content for consumption by a user. For example, the computing device may remotely access media device that includes a text providing application, electronic publication reading application, audio book application, augmented reading application that digitally registers the text, video playing application, or the like. For example, aspects of the method may be executed on a server that is in communication with an electronic reader device or audio playback device or the like.

The flow diagram 100 begins with media data being provided to a user that is consuming the media content (101). For example, a user may consume the content in the form of text or audio stream that provides a progressive stream of textual or auditory content to be consumed over time or in response to the user scrolling or the like. If the user is listening to a podcast or audio book or watching visual media or the like, a transcript may be obtained either by a speech-to-text module (e.g., a module in computer device 300) or some other translation module that is configured to convert the media data to text as the media is consumed. Alternatively, in some examples only a specific portion of content that is selected/determined may be converted to text as described below.

The flow diagram 100 may include identifying a pause point at which the user stops or momentarily pauses consuming the content (102). The pause point may be identified by various methods. In one embodiment, the user may manually mark their pause point at a point in the text or audio stream. In other embodiments, a computing device may be configured to autonomously identify the pause point. For example, when the media data is a podcast, the computing device may identify the pause point as a point in the podcast when the audio stream is paused. Alternatively, when the media data is text, the computing device may identify the pause point as a portion of the text that was displayed in display window when the user closes the display. In an electronic reader application, a current page may be automatically recorded (e.g., such that the page is identified in response to the user putting the electronic reader device down), and the pause point may be automatically recorded as the end of the currently displayed page. In a further embodiment, the pause point may be autonomously determined using eye tracking of the user as the user reads text via a web cam of a computing device displaying the text or via an augmented device such as smart glasses used by a user when consuming content.

At some point in time following the user pausing consuming the media content, the user may resume use/consumption of the media data. For example, the user may resume consumption of the media data by reopening an electronic window that contains the media data, restarting an electronic reader device, restarting an audio book, or the like. The method may determine an elapsed time from the pause point until the user resumes consumption of the media data (103).

The method of the flowchart 100 determines a portion of the content that precedes the identified pause point (104). The method may determine this portion of the media data as a portion with which context and concepts of the media data are identified, and/or a portion within which continuation points are selected. For example, where the pause point was at page 100 of a book, a computing device may determine to select media data of pages 90-99 of the book as the portion of the book. For another example, where the pause point was at minute 30 of a podcast, a computing device may determine media data of minutes 21-29 of the podcast as the portion of the media data as described herein. The portion of the media data may "end" at the pause point and "begin" at a point in the media data that precedes the pause point. In other examples, the portion of media data may end at a point that is slightly past the pause point (e.g., where the media data includes some context past the pause point and/or the user errantly scrolled back before pausing, or the like).

The length and/or amount of media data of the determined portion may relate to the elapsed time. Alternatively, and/or additionally, the amount of media data of the determined portion may be based on user preferences. In some examples, for some users a relatively longer temporal pause between consumption of the media data may require that a relatively greater portion of the media data be analyzed to determine the context. Put differently, in some examples, the longer the period of time for which the user hasn't consumed the media data, the more media data the user may desire in order to understand the content of the pause point.

As described above, a user may set user preferences that relate to the amount of media data that precedes the pause point to be determined as part of the portion of media data with which a continuation point is identified. For example, a user may know that they often read the last few pages too fast trying to find an end point, such that the user specifies that the pause point may be a page or so prior to the pause point. For another example, a user may specify in the user preferences a general ration between length of the determined portion and a length of the elapsed time, where a longer elapsed time may increase a length of the determined portion. User preferences may be further be derived by identifying how much context a user has needed based on previous pauses of various lengths. In this way, user preferences for how far back a user likes to restart consuming the content may be configured manually or may be measuring by monitoring the user's habits and measuring a length of content that they usually choose.

The method may analyze the determined portion of content to identify changes in content concepts within the determined portion (105). In some examples, natural language processing (NLP) techniques may be used to identify sentences and paragraphs which naturally make good continuation points. In some examples, a change in concept may mark a good continuation point because a user may benefit from reading most or all the text discussing the same concept in order to understand it. The analysis may start relatively close to the pause point and proceed backwards through the portion of content. The analysis may go further back in the content than the portion of content if no concept change is found in the portion of content. The analysis of the content may include natural language processing (NLP) of the text to interpret concepts within the text. Details of example embodiments of the analysis are given below. The audio content may be converted to text by a speech-to-text conversion that is executed prior to the analysis.

The analysis may rank or score the change in concepts. For example, the analysis may assign higher or otherwise "stronger" scores to data that includes a relatively higher number of different concepts, where the higher scores indicate a relatively more dramatic concept change. Once these concepts are identified and associated with scores or rankings, the method may identify one or more continuation points to the user to return to the content based on changes in the content concepts in the portion of content (106). For example, these continuation points may be at points prior to notable concept changes, such that a user may consume media data that includes all or more concepts that are related to the excerpt of the media data that includes the pause point. The continuation points may be selected using the elapsed time, where a relatively longer elapsed time may result in the method selecting a relatively stronger or more dramatic concept change. Once identified, the method may indicate the one or more continuation points to the user (107). For example, for media data that predominantly includes text, the indication may highlight the word at the continuation point or may move the focus of the screen to the word at the continuation point or the like.

The continuation points may reference further reference points in the content such as different concept changes, such as change in location, time period, perspective, or description. The number of reference points may depend on the elapsed time, the number of concept changes within the determined portion, user preferences, or the like. A user may access each of these referenced data points to confirm or modify the identified continuation point. For example, a user may delete one reference point that the user determines is not relevant to the user's comprehension. In response to this the method may identify and indicate a subsequent continuation point which follows the originally offered continuation point (e.g., where the subsequent continuation point is past the point in the media data which provides the irrelevant context). In some examples, where a plurality of continuation points are offered, each continuation point may be annotated to identify if the different continuation points relate to different subcategories, such as a change in location/setting (where), a change in time period (when), a change in perspective (who), a change in description (what), or the like.

In some examples, the method may generate more continuation points the longer the user has been away (e.g., as it may be relatively more likely that the user may have forgotten the immediate context of where they left the content, and/or the user may want more options for picking up the thread of the media data). That number of continuation points and/or the nature of different continuation points may be related to user preferences for different users with varying abilities to regain context of text. The user may continue consuming the content from the offered continuation point, therein being relatively more able to understand the content they are consuming. User feedback may be provided as to a rating of the continuation point, where such feedback acts as a feedback loop for the computing device to improve a process of identifying continuations points. In some examples, the computing device may further undergo machine learning when a plurality of continuation points are selected by a user as described herein.

Figure 2:
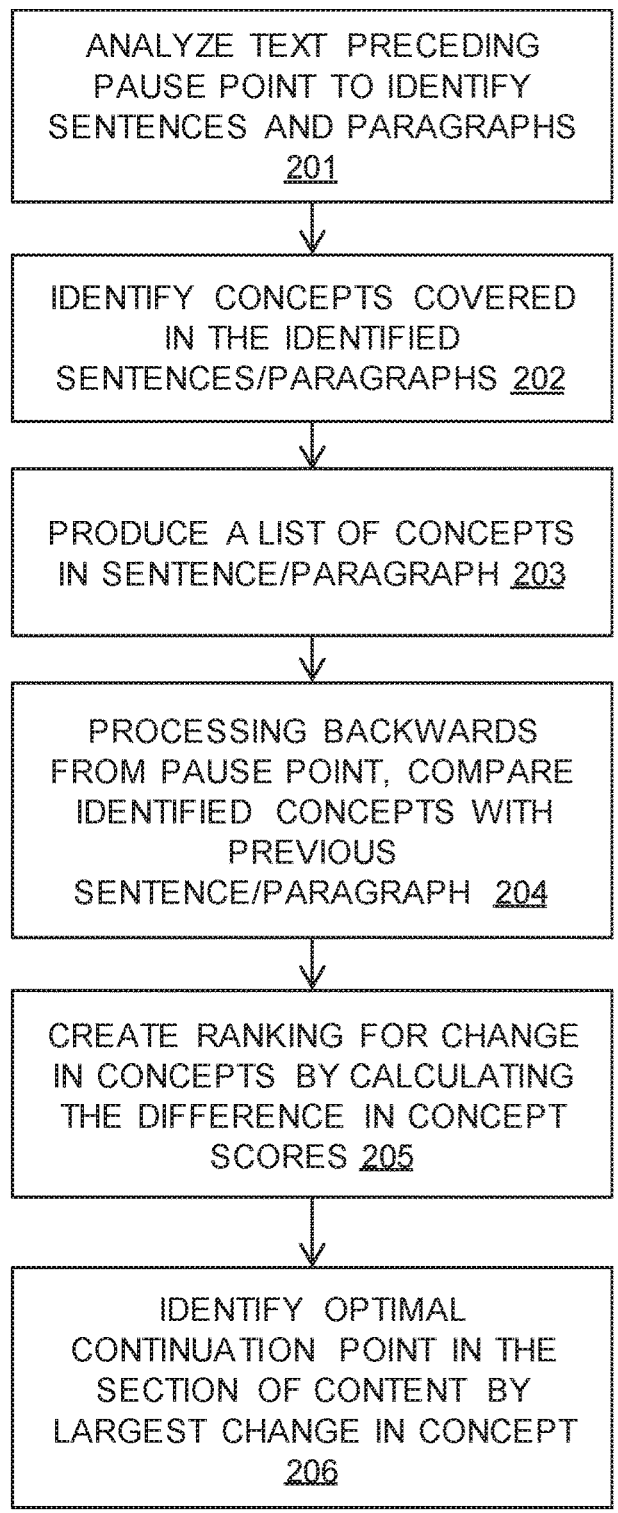
FIG. 2 is a flow diagram of an example of an aspect of a method of managing the consumption of a media file.

Referring to FIG. 2, a flow diagram 200 shows an example method of analyzing text to identify continuation points. A computing device (e.g., such as computing device 300 of FIG. 3) may analyze text before the pause point to identify units of the media data, such as sentences and paragraphs of the media data (201). The method may identify sentences and/or paragraphs according to one or more techniques. In one embodiment, a computing device may identify sentences and/or paragraphs by analyzing punctuation in text to identify a beginning of a sentence (e.g., identify a capital letter that follows a period) and identify an ending of a sentence ends (e.g., identify a period followed by one or more spaces). Similarly, a computing device may be configured to identify when a paragraph begins and/or ends (e.g., by identifying an indentation or a new line and extra white space). However, in some examples this may not be sufficiently accurate to determine all or enough sentences and/or paragraphs. For example, a computing device may not be able to identify sentences and/or paragraphs by such optical-character recognition (OCR) techniques if the media data is primarily audible, such that the text that is available is generated by a speech-to-text conversion.

In such examples, other techniques for identifying units of the media data such as sentences and paragraphs may be utilized. For example, paragraphs may be autonomously identified by other techniques (e.g., such as a technique described in "Automatic Paragraph Identification: A Study across Languages and Domains" by Caroline Sporleder and Mirella Lapata. Conference: Proceedings of the 3004 Conference on Empirical Methods in Natural Language Processing, EMNLP 3004) in different languages and domains using a machine learning approach which exploits textual and discourse cues. Textual cues may be identified using syntactic and discourse related information to determine paragraph boundaries (e.g., outer bounds of a paragraph that contain all words, annotations, and/or symbols of the paragraph). In such examples, a computing device may execute paragraph boundary identification as a classification task. The computing device may execute such machine learning techniques using natural language processing elements such as non-syntactic features, language modeling features, and syntactic features to classify the paragraph boundaries.

The method may identify concepts covered in the identified sentences and paragraphs (202). A simple implementation of this may be taking a sum of all the nouns in the sentence or paragraph and dividing it by the number of times it appears in the entire contents (for example, the book, article, etc.). Identifying concepts may be improved further by using an information retrieval framework such as IBM Watson Concept Insights application programming interface (IBM Watson is a trademark of International Business Machines Corporation).

The information retrieval framework may be configured to facilitate search and exploration of text documents, and may be particularly effective on sparse data sets. The methodology of the information retrieval framework may include defining a dictionary of concepts which are interconnected in a concept graph and then modeling a document by predicting its relevance to one or more given concepts in the concept graph using the concepts that are directly mentioned in the document itself. This technique in effect may increase document recall, even for very sparse data sets, exposing the user to a variety of connections between their query and a data set of interest. Such an information retrieval framework may be used to analyze "free text" (e.g., unstructured text that has a minimum amount of metadata identifying key words and concepts or the like) and therein identify terms and concepts related to the text sample. Given a set of text samples, the information retrieval framework may be used to extract related terms and use this information to locate text samples that share a reasonable number of concepts. This may be used to produce a list of important concepts in the sentence or paragraph (203).

Processing backwards from the pause point, the concepts identified in the sentence or paragraph may be compared to the previous sentence or paragraph (204). A computing device may determine a ranking for each of the concepts of the list (205). Rankings may relate to a degree to which concepts change. For example, a computing device may determine a relative difference between concepts that are referenced or discussed between two or more sentences or paragraphs. If the two or more paragraphs or sentences have similar concepts the computing device may determine the score between the two or more paragraphs or sentences to be relatively low. Conversely, if the two or more paragraphs or sentences have relatively dissimilar concepts, the computing device may determine the scores to be high.

The method may identify one or more continuation points for the user to return to the content (206). The computing device may identify the one or more continuation points by identifying relative continuation points which have a relatively large change in concept to content adjacent the pause point. Once the one or more continuation points are identified, the computing device may display media content at a sentence or paragraph that is adjacent the continuation point (e.g., immediately preceding or following the identified continuation point). As discussed above, a relative amount of the media data that may be "reconsumed" by the user may be dependent upon a variety of factors, such as an amount of time that has elapsed since the user has stopped consuming the media data. For example, if the user stops consuming the media data for a relatively short period of time, the user may be relatively more likely to remember what has happened. Such determinations of how much media data may be reconsumed (e.g., shown to the user twice) may be based on user preferences. In this way, the method may identify how much a concept of the media content changes over a length of the media content, therein determining how high of a change score to select (and therein how much of the evolving concepts of the media content to re-display to the user) based on how much time has elapsed since the user has stopped consuming the media content, with possible weightings due to personal preferences.

In another embodiment, a computing device may weigh factors such as the text context of paragraphs and sentences, the changes in concepts, the time elapsed, and the user preferences to identify a starting point for the user. In some examples, a computing device may weight such factors using a fixed algorithm. For example, an algorithm may include [time elapsed]×[1 word per hour] rounded to the [nearest major change in concept], though in other examples different algorithms may be used. In some examples, a general algorithm could be produced and then improved by creating a specific profile for the user. Such algorithm creation and modification and perfect may be improved upon by using machine learning (for example, a neural network or decision tree) that is configured to receive the inputs to produce an output of a length of the media content (e.g, a number of words) which the computing device may re-display for the user. Feedback from the user may be used to improve the machine learning model. For example, the machine learning model may learn by seeing if the user skips forward or jumps back from the suggested continuation point, therein adjusting the algorithm accordingly.

The method may use different concepts which may feed into a natural language processor. Examples of different concepts include the most recent chapters to the pause point in the content, relatable keywords relevant to the chapter the user will continue from, or the like. This aspect of the method may include calculating a significance of concepts by weighing how frequently a concept appears in the media content. For example, if there are two main characters that appear together throughout a book, a sudden appearance of one character without the other may be relatively important, but not as important as a new character altogether. NLP and literary techniques such as this may be expanded to identify the frequency a concept appears in the content and which concepts appear frequently together.

For example, a user may be reading a book on a computer which is tracking where the user is currently reading using a webcam eye tracking. The user may stop reading, in response to which the computer may identify the last portion of media data that was read by the user (e.g., the pause point) and the time at which the user stopped. The user may eventually return to the book after a week. The computer may identify the pause point and analyze a portion of text before it. The computer may use the determination that it has been a week since the user has last read the book to determine to select a continuation point that reflects the last (e.g., most recently consumed by the user) concept change of the media content. Upon identifying a paragraph in the book which changed from describing a landscape to describing a conversation, the computer selects this paragraph as the continuation point, and displays this paragraph for the user. In some examples, the computer may even highlight some or all of the paragraph as the continuation point. The computer may use the webcam eye tracking functionality to identify that the user starts reading from the identified continuation point without jumping ahead and/or behind, therein reinforcing the parameters and factors and the like that were utilized by the computer to determine the continuation point. In this way, the computer may be configured to display media data to a user in a manner that may increase the ability of the user to quickly comprehend the concepts of media data.

Figure 3:
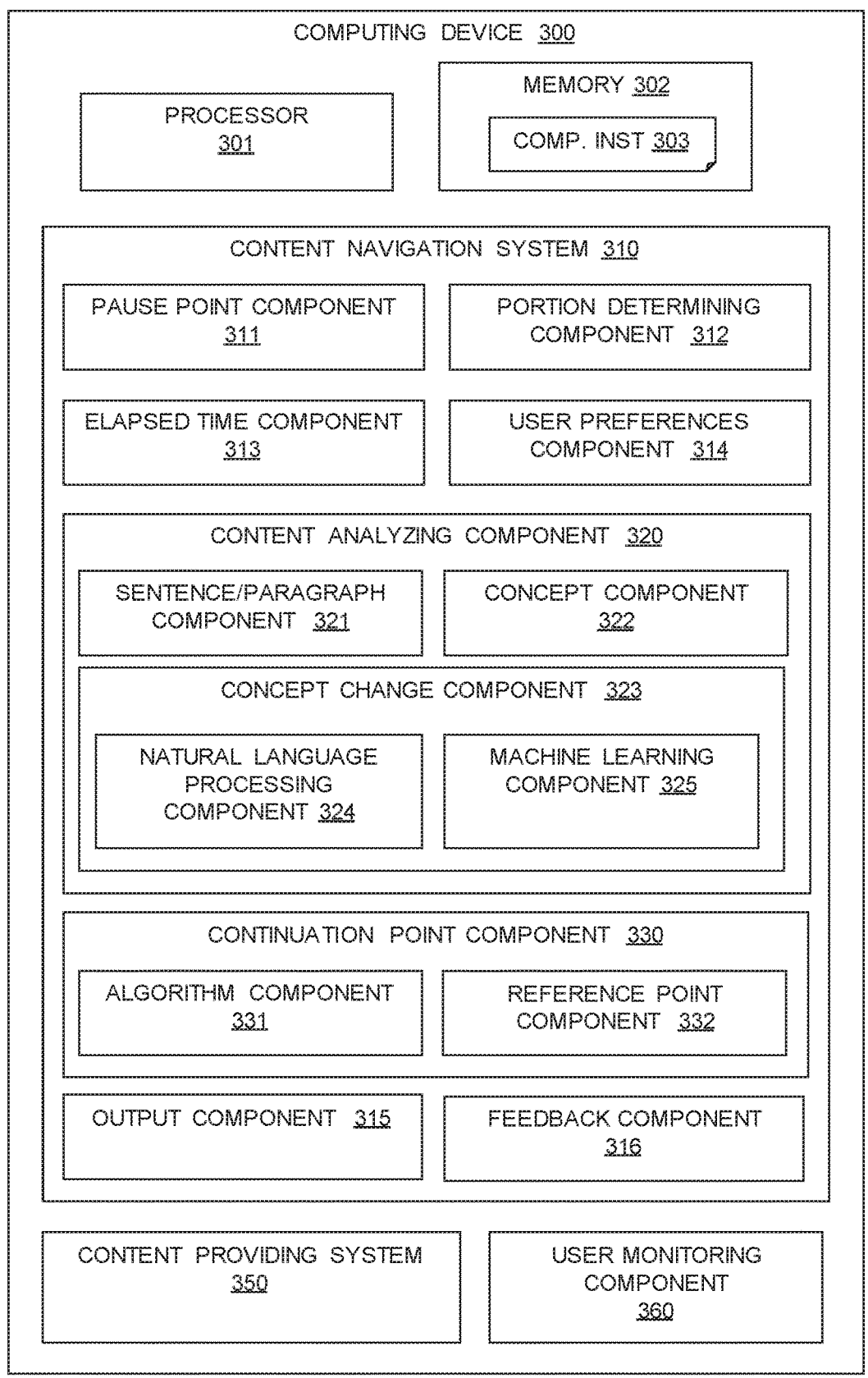
FIG. 3 is block diagram of an example system for managing consumption of a media file.

Referring to FIG. 3, a block diagram shows a computing device 300 in which the described content navigation system 310 may be implemented. The content navigation system 310 may provide a continuation point for a user to recommence consuming content of media data that may be played by a content providing system 350. Content providing system 350 may be a computing system that is configured to provide the media data to a user in a manner in which the user may consume the content, whether with visible text on a display, audible text generated by a speaker, visual and audible data of a video, or the like. In some examples, computing device 300 may include content providing system 350 as depicted in FIG. 3. In other examples, the computing device 300 may be a separate discrete physical device from content providing system 350, and the two devices 300, 350 may be communicatively coupled to each other.

The computing device 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to store computer instructions 303, such that the at least one processor 301 may execute operations of these computing instructions 303 to carry out the functionality of the components described herein (e.g., such as functionality of flowcharts 100, 200).

The content navigation system 310 may include a pause point component 311 for identifying a pause point at which the user pauses consuming the content. The pause point component 311 may receive inputs including manual user inputs, inputs resulting from actions in the content providing system 350, and/or inputs from a user monitoring component 360 such as an eye tracking component of the content navigation system 310 or the content providing system 350. The content navigation system 310 may include a portion determining component 312 for determining a portion of content preceding the identified pause point within which a context of the media data is to be identified. The portion determining component 312 may be configured to extend a length of the portion of content preceding the pause point in the event that no continuation point is identified in the portion of content.

The content navigation system 310 may include an elapsed time component 313 for determining an amount of time that has elapsed time since the user stopped consuming media provided by the content providing system 350. As described above, the portion determining component 312 may determine a portion of content in which the computing device may search for continuation points based on the elapsed time.

The content navigation system 310 may include a user preferences component 314 for determining user preferences. For example, the user preferences component 314 may store a preferred length of content between a pause point and a continuation point for given elapsed periods of time based on past interactions with media data. Using this stored user preference, the portion determining component 312 may identify a portion of in which the computing device may search for continuation points.

The content navigation system 310 may include a content analyzing component 320 for analyzing the portion of content. The content analyzing component 320 may analyze the portion of content to identify changes in content concepts in the portion of content. The content navigation system 310 may include a continuation point component 330 for identifying one or more continuation points for the user to return to the content based on changes in the content concepts in the portion of content. The content analyzing component 320 may include a sentence or paragraph component 321 for identifying sentences or paragraphs in the portion of text. The content analyzing component 320 may further include a concept component 322 for identifying concepts covered in the sentences or paragraphs and producing a list of the sentences and/or paragraphs.

In one embodiment, the content analyzing component 320 also includes a concept change component 323. The concept change component 323 may be configured to compare sentences or paragraphs of the list with a previous sentence or paragraph to determine a relatively large change in concept in the portion of content. Using this relatively large change in concept, the continuation point component 330 may identify a continuation point (e.g., the continuation point may be the beginning of a paragraph or sentence after the largest change in concept as determined by the concept change component 323).

In another embodiment, the continuation point component 330 may include an algorithm component 331 for using a fixed algorithm that weighs such factors as an elapsed time from the pause point until the user resumes use of the media data, user preferences for a length of content between a pause point and a continuation point, identified sentences or paragraphs in the portion of text, identified concepts covered in the sentences or paragraphs and producing a ranked list for the sentence or paragraph, or the like. The content analyzing component 320 may be configured to utilize a natural language processing component 324 and/or may include using a machine learning component 325 for carrying out aspects of the content analysis. The continuation point component 330 may include a reference point component 332 for determining a series of reference points. Each of these reference points may mark changes in a concept of the media data. Changes in concept may include one or more of changes in location, changes in time period, changes in perspective, changes in description, or the like.

The content navigation system 310 may include an output component 315 for indicating the one or more continuation points to the user. The output component 315 may include indicating the one or more continuation points to the user includes highlighting a starting word or moving a focus of a display of the content to the starting word when the user resumes user of the media data. The content navigation system 310 may include a feedback component 316 for gathering user feedback on the identified continuation points to improve the method.

Figure 4:
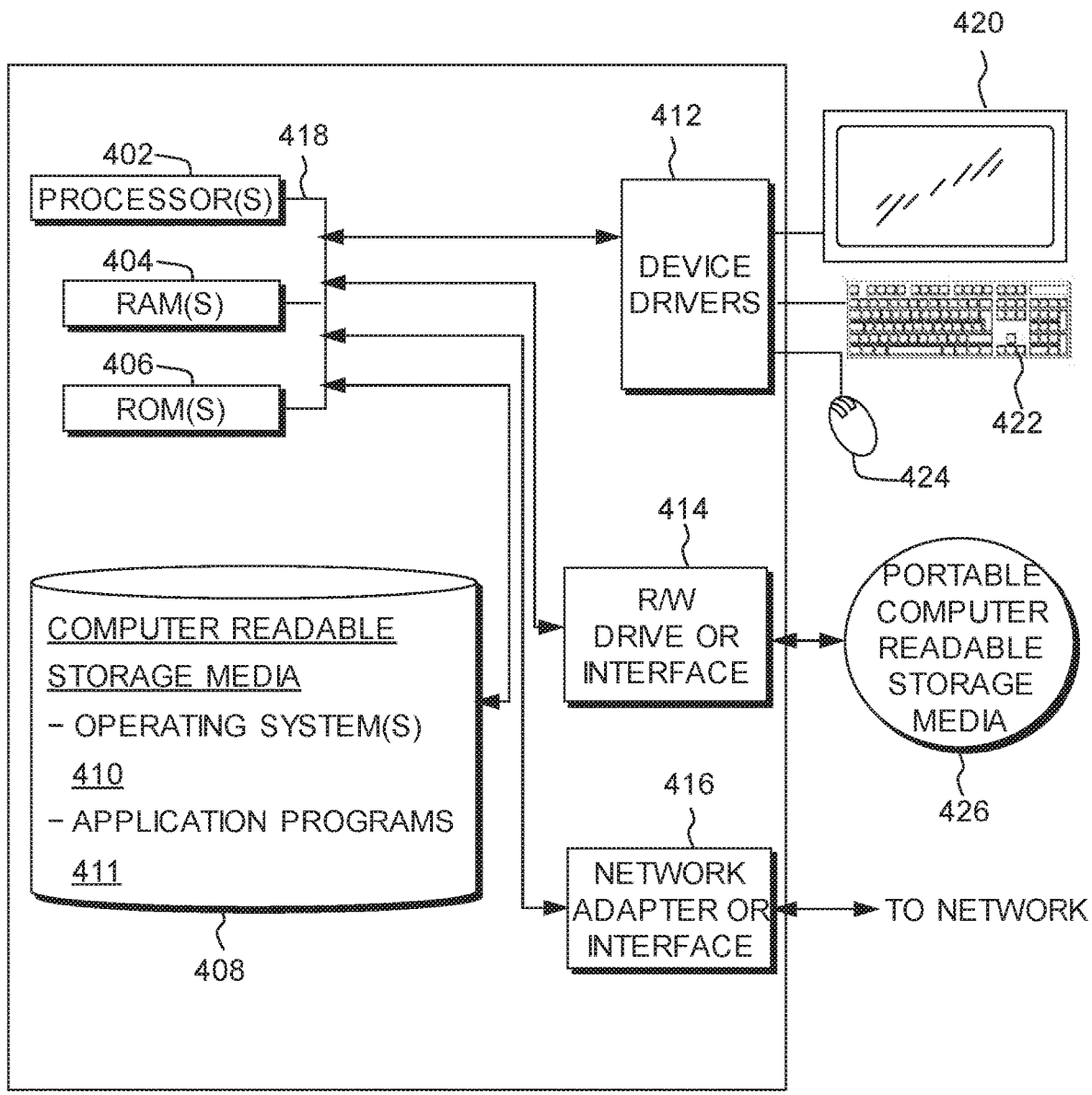
FIG. 4 is a block diagram of an embodiment of a computer system or cloud server in which the present invention may be implemented.

FIG. 4 depicts a block diagram of components of the computing device 300 of FIG. 3, in accordance with an embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 300 can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the content navigation system 310 and content providing system 350 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 300 can also include a R/W drive or interface 414 to read from and write to one or more portable computer readable storage media 426. Application programs 411 on computing device 300 can be stored on one or more of the portable computer readable storage media 426, read via the respective R/W drive or interface 414 and loaded into the respective computer readable storage media 408.

Computing device 300 can also include a network adapter or interface 416, such as a TCP/IP adapter card or wireless communication adapter. Application programs 411 on computing device 300 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device 300 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
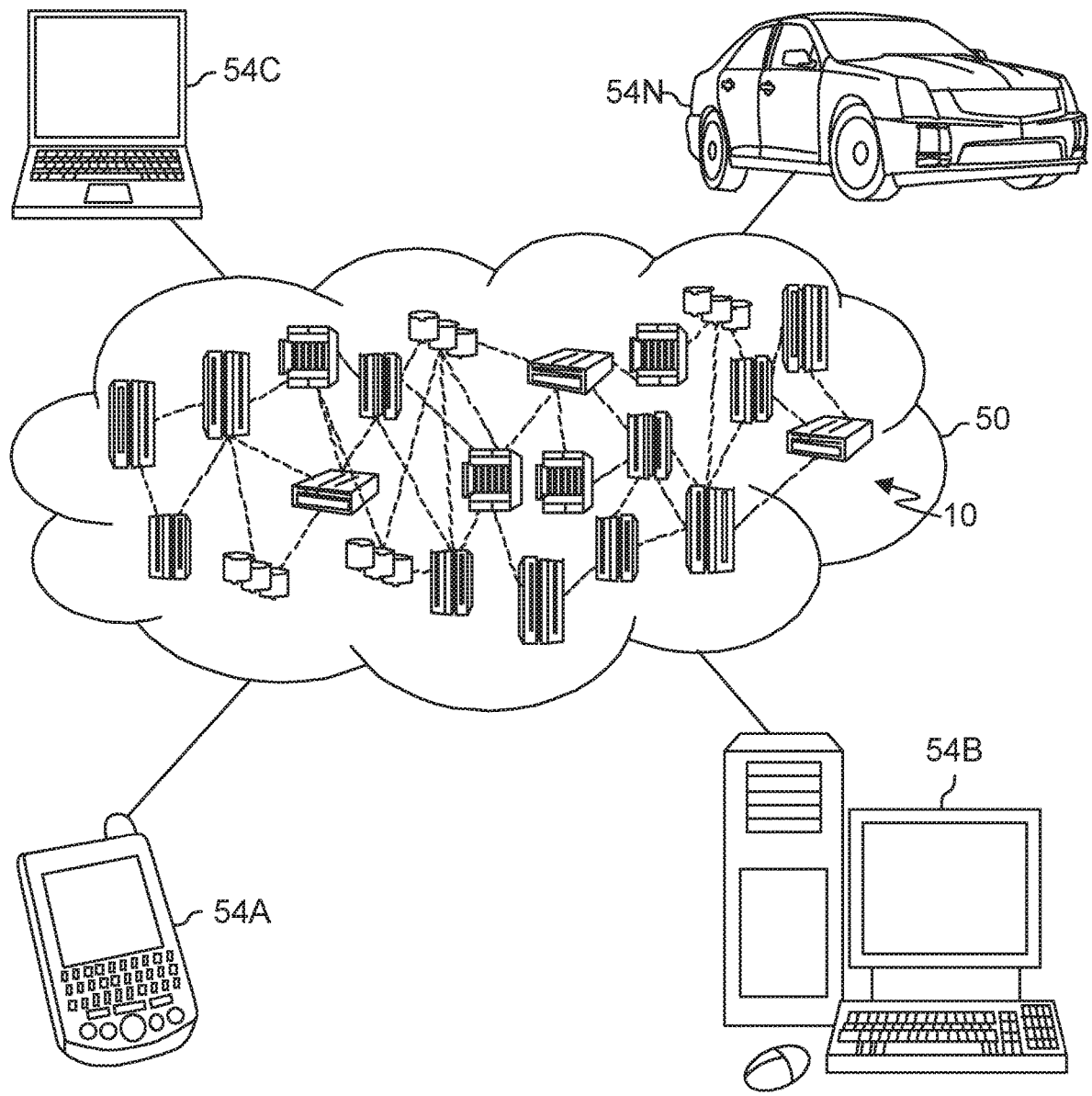
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
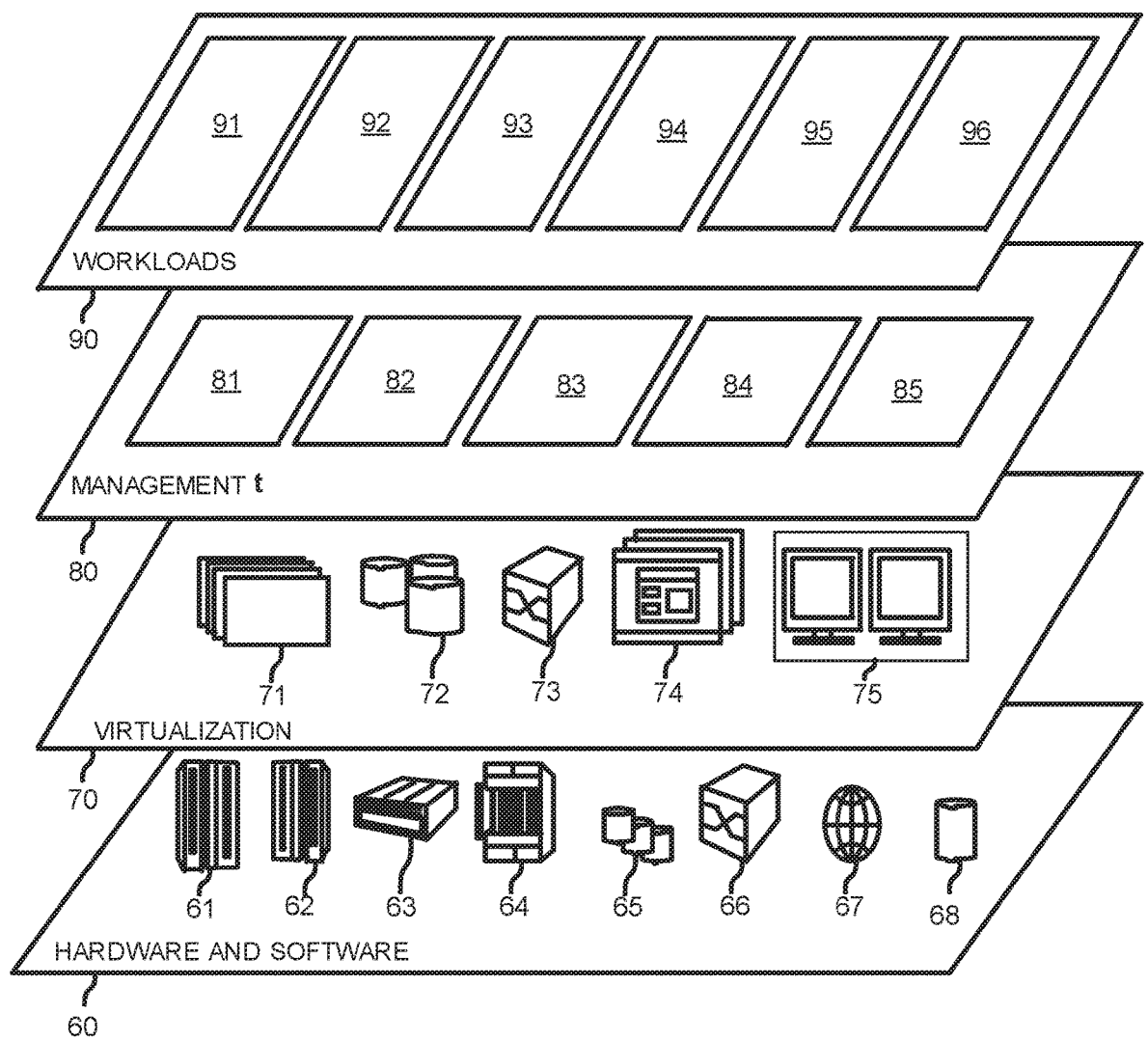
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content navigation processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for managing consumption of media data, the method comprising:
    identifying a pause point during consumption of media data at which a user stops the consumption of the media data;
    determining a portion of content that precedes the identified pause point, wherein the portion is determined based on at least one of a user preference and a factor regarding the consumption of the media data by the user;
    analyzing the portion of content by using natural language processing techniques regarding interrelations between words of the portion of content to identify changes in content concepts in the portion of content, wherein the analyzing includes determining a respective rank of each of the changes that corresponds to how large each respective change is compared to others of the changes;
    identifying one or more continuation points for the user to return to the content based on how changes in the content concepts in the portion of content as indicated by respective ranks of each of the changes correspond to one or more factors that identify how the user prefers to reconsume the media data; and
    indicating the one or more continuation points to the user.

2. The method as claimed in claim 1, including:
    determining an elapsed time from the pause point until the user resumes consumption of the media data, wherein the elapsed time is one of the one or more factors, wherein the portion of content has a length based on the elapsed time.

3. The method as claimed in claim 1, including:
    determining user preferences for a length of content between a pause point and a continuation point from past interactions with media data, wherein the user preferences are included in the one or more factors, wherein the portion of content has a length based on the user preferences.

4. The method as claimed in claim 1, wherein analyzing the portion of content to identify changes in content concepts in the portion of content includes:
    identifying sentences or paragraphs in the portion of text; and
    identifying concepts covered in the sentences or paragraphs.

5. The method as claimed in claim 4, including:
    comparing the sentences or paragraphs with concepts of previous sentences or paragraphs to determine a largest change in concept in the portion of content as reflected by a highest respective rank,
    wherein a continuation point is identified as a beginning of a respective paragraph or sentence after the largest change in concept.

6. The method as claimed in claim 1, wherein identifying one or more continuation points for the user to return to the content includes using a fixed algorithm with inputs of the one or more factors, where the one or more factors include one or more of the group of:
    an elapsed time from the pause point until the user resumes use of the media data;
    user preferences for a length of content between a pause point and a continuation point;
    identified sentences or paragraphs in the portion of text; and
    identified concepts covered in the sentences or paragraphs and the respective ranks that correspond to the sentence or paragraph.

7. The method as claimed in claim 1, wherein analyzing the portion of content to identify changes in content concepts in the portion of content includes using a natural language processing application programming interface.

8. The method as claimed in claim 1, wherein analyzing the portion of content to identify changes in content concepts in the portion of content includes using machine learning.

9. The method as claimed in claim 1, including extending a length of the portion of content preceding the pause point in the event that no continuation point is identified in the portion of content.

10. The method as claimed in claim 1, wherein indicating the one or more continuation points to the user includes highlighting a starting word or moving a focus of a display of the content to the starting word when the user resumes user of the media data.

11. The method as claimed in claim 1, wherein identifying one or more continuation points for the user to return to the content based on changes in the content concepts in the portion of content includes:
    determining a series of reference points marking changes in concept aspects at points preceding an identified continuation point, wherein the changes in concept aspects include one or more of the group of: changes in location, changes in time period, changes in perspective, and changes in description.

12. The method of claim 1, wherein the one or more continuation points are indicated to the user with one or more respective annotated details on the concept changes.

13. The method of claim 12, wherein indicating the one or more continuation points to the user includes indicating both a first continuation point with a first annotated detail regarding a first respective change of content concept and indicating a second continuation point with a second annotated detail regarding a second respective change of content concept.

14. A system for managing consumption of media data, the system comprising:
a processor; and
a memory communicatively coupled to the processor, the memory including computer instructions that, when executed by the processor, cause the processor to:
identify a pause point during consumption of media data at which a user stops the consumption of the media data;
determine a portion of content preceding the identified pause point, wherein the portion is determined based on at least one of a user preference and a factor regarding the consumption of the media data by the user;
analyze the portion of content by using natural language processing techniques regarding interrelations between words of the portion of content to identify changes in content concepts in the portion of content, wherein the analyzing includes determining a respective rank of each of the changes that corresponds to how large each respective change is compared to others of the changes;
identify one or more continuation points for the user to return to the content based on how changes in the content concepts in the portion of content as indicated by respective ranks of each of the changes correspond to one or more factors that identify how the user prefers to reconsume the media data; and
indicate the one or more continuation points to the user.

15. The system as claimed in claim 14, the memory further comprising instruction that, when executed by the processor, cause the processor to determine an elapsed time from the pause point until the user resumes consumption of the media data, wherein the elapsed time is one of the one or more factors, wherein the portion of content has a length based on the elapsed time.

16. The system as claimed in claim 14, the memory further comprising instruction that, when executed by the processor, cause the processor to:
determine user preferences for a length of content between a pause point and a continuation point from past interactions with media data, wherein the user preferences are included in the one or more factors, wherein the portion of content has a length based on the user preferences.

17. The system as claimed in claim 14, wherein analyzing the portion of content to identify changes in content concepts in the portion of content includes identifying sentences or paragraphs in the portion of text and identifying concepts covered in the sentences or paragraphs, the memory further comprising instruction that, when executed by the processor, cause the processor to:
compare the sentences or paragraphs with concepts of previous sentences or paragraphs to determine a largest change in concept in the portion of content as reflected by a highest respective rank,
wherein a continuation point is identified as a beginning of a respective paragraph or sentence after the largest change in concept.

18. The system as claimed in claim 14, wherein identifying one or more continuation points for the user to return to the content includes using a fixed algorithm with inputs of the one or more factors, where the one or more factors include one or more of the group of:
an elapsed time from the pause point until the user resumes use of the media data;
user preferences for a length of content between a pause point and a continuation point;
identified sentences or paragraphs in the portion of text; and
identified concepts covered in the sentences or paragraphs and producing a ranked list for the sentence or paragraph.

19. The system as claimed in claim 14, wherein analyzing the portion of content to identify changes in content concepts in the portion of content includes extending a length of the portion of content preceding the pause point in the event that no continuation point is identified in the portion of content.

20. A computer program product for providing a continuation point for a user to recommence consuming content in a content providing media data, the computer program product comprising a computer readable storage medium having program instructions embodied therewith, the program instructions executable by a processor to cause the processor to:
identify a pause point during consumption of media data at which a user stops the consumption of the media data;
determine a portion of content preceding the identified pause point;
analyze the portion of content by using natural language processing techniques regarding interrelations between words of the portion of content to identify changes in content concepts in the portion of content, wherein the analyzing includes determining a respective rank of each of the changes that corresponds to how large each respective change is compared to others of the changes;
identify one or more continuation points for the user to return to the content based on how changes in the content concepts in the portion of content as indicated by respective ranks of each of the changes correspond to one or more factors that identify how the user prefers to reconsume the media data; and
indicate the one or more continuation points to the user.

* * * * *